(12) United States Patent
Mouleeswaran et al.

(10) Patent No.: US 12,541,508 B2
(45) Date of Patent: Feb. 3, 2026

(54) AI-POWERED MACROS TO PROCESS COMPLEX NLP QUERIES ACROSS DOMAINS

(71) Applicant: Palo Alto Networks, Inc., Santa Clara, CA (US)

(72) Inventors: Chandra Biksheswaran Mouleeswaran, Cupertino, CA (US); Sathya Prakash Rajagopal, San Jose, CA (US); Gaspar Modelo-Howard, Fremont, CA (US); Alok Tongaonkar, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/755,386

(22) Filed: Jun. 26, 2024

(65) Prior Publication Data

US 2025/0298807 A1  Sep. 25, 2025

Related U.S. Application Data

(60) Provisional application No. 63/568,851, filed on Mar. 22, 2024.

(51) Int. Cl.
| | | |
|---|---|---|
| *G06F 7/00* | (2006.01) | |
| *G06F 16/242* | (2019.01) | |
| *G06F 16/248* | (2019.01) | |
| *G06F 21/57* | (2013.01) | |

(52) U.S. Cl.
CPC ........ *G06F 16/243* (2019.01); *G06F 16/2433* (2019.01); *G06F 16/248* (2019.01); *G06F 21/577* (2013.01)

(58) Field of Classification Search
CPC .... G06F 16/248; G06F 16/243; G06F 16/334; G06F 16/335; G06F 16/345; G06F 16/3349; G06F 16/3344; G06F 16/3329; G06F 16/2425; G06F 16/24542; G06N 3/08; G06N 3/0475; G06N 3/092; G06N 5/04; G06N 20/00
See application file for complete search history.

(56) References Cited

U.S. PATENT DOCUMENTS

| | | | |
|---|---|---|---|
| 11,017,764 B1 | 5/2021 | Das | |
| 11,416,563 B1* | 8/2022 | Spagnolo | .............. G06F 16/951 |
| 12,061,970 B1* | 8/2024 | Lo | ............................ G06N 3/10 |

(Continued)

OTHER PUBLICATIONS

Wang et al., Grammar Prompting for Domain-Specific Language Generation with Large Language Models, 37th Conference on Neural Information Processing Systems (NeurIPS 2023), pp. 1-26.

(Continued)

*Primary Examiner* — Mohammad A Sana
(74) *Attorney, Agent, or Firm* — Van Pelt, Yi & James LLP

(57) ABSTRACT

Techniques for AI-powered macros to process complex natural language processing (NLP) across domains are disclosed. In some embodiments, a system, a process, and/or a computer program product for AI-powered macros to process complex NLP across domains includes processing a natural language query; performing a cross-domain search to generate a search result using a plurality of data source domains using a resource query language (RQL) and a Large Language Model (LLM); and outputting the search result.

20 Claims, 12 Drawing Sheets

(56) References Cited

U.S. PATENT DOCUMENTS

| | | | |
|---|---|---|---|
| 2010/0191855 A1* | 7/2010 | Tian | H04L 67/1093 |
| | | | 709/226 |
| 2015/0332670 A1 | 11/2015 | Akbacak | |
| 2021/0182935 A1 | 6/2021 | Malkiel | |
| 2021/0303555 A1* | 9/2021 | Kim | G06F 16/90332 |
| 2022/0230089 A1 | 7/2022 | Peraud | |
| 2024/0202464 A1 | 6/2024 | Poirier | |
| 2025/0036616 A1* | 1/2025 | Wang | G06F 16/24522 |

OTHER PUBLICATIONS

Yamin et al., Applications of LLMs for Generating Cyber Security Exercise Scenarios, Feb. 26, 2024, pp. 1-17.

Yang et al., LeanDojo: Theorem Proving with Retrieval-Augmented Language Models, 37th Conference on Neural Information Processing Systems (NeurIPS 2023) Track on Datasets and Benchmarks, pp. 1-40.

* cited by examiner

Entity Extraction

User:

*Find Azure Cosmos DB assets that are reachable from the internet*

AI:

{

"findings": "reachable from the internet",

"asset": "azure cosmos DB",

"cloudType": "azure"

}

User:

*Which EC2 instances have unrestricted access from the Internet, are talking to Backdoor hosts, and have vulnerabilities of high severity or greater?*

AI:

{

"findings": "unrestricted access from the internet",

"vulnerabilities": "high severity or greater",

"asset": "EC2 instances",

"relationships": "talks to Backdoor hosts"

| id | description | score |
|---|---|---|
| CVE-2021-44228 | Apache Log4j2 2.0-beta9 through 2.15.0 (excluding security releases 2.12.2, 2.12.3, and 2.3.1) JNDI features used in configuration, log messages, and parameters do not protect against attacker controlled LDAP and other JNDI related endpoints. An attacker who can control log messages or log message parameters can execute arbitrary code loaded from LDAP servers when message lookup substitution is enabled. From log4j 2.15.0, this behavior has been disabled by default. From version 2.16.0 (along with 2.12.2, 2.12.3, and 2.3.1), this functionality has been completely removed. Note that this vulnerability is specific to log4j-core and does not affect log4net, log4cxx, or other Apache Logging Services projects. | 7.539313 |
| CVE-2020-9488 | Improper validation of certificate with host mismatch in Apache Log4j SMTP appender. This could allow an SMTPS connection to be intercepted by a man-in-the-middle attack which could leak any log messages sent through that appender. Fixed in Apache Log4j 2.12.3 and 2.13.1 | 5.828557 |
| CVE-2021-44832 | Apache Log4j2 versions 2.0-beta7 through 2.17.0 (excluding security fix releases 2.3.2 and 2.12.4) are vulnerable to a remote code execution (RCE) attack when a configuration uses a JDBC Appender with a JNDI LDAP data source URI when an attacker has control of the target LDAP server. This issue is fixed by limiting JNDI data source names to the java protocol in Log4j2 versions 2.17.1, 2.12.4, and 2.3.2. | 5.6820803 |
| CVE-2019-17571 | Included in Log4j 1.2 is a SocketServer class that is vulnerable to deserialization of untrusted data which can be exploited to remotely execute arbitrary code when combined with a deserialization gadget when listening to untrusted network traffic for log data. This affects Log4j versions up to 1.2 up to 1.2.17. | 5.637389 |
| CVE-2021-44530 | An injection vulnerability exists in a third-party library used in UniFi Network Version 6.5.53 and earlier (Log4J CVE-2021-44228) allows a malicious actor to control the application. | 4.9515257 |
| CVE-2017-5645 | In Apache Log4j 2.x before 2.8.2, when using the TCP socket server or UDP socket server to receive serialized log events from another application, a specially crafted binary payload can be sent that, when deserialized, can execute arbitrary code. | 4.478466 |
| CVE-2019-17531 | A Polymorphic Typing issue was discovered in FasterXML jackson-databind 2.0.0 through 2.9.10. When Default Typing is enabled (either globally or for a specific property) for an externally exposed JSON endpoint and the service has the apache-log4j-extra (version 1.2.x) jar in the classpath, and an attacker can provide a JNDI service to access, it is possible to make the service execute a malicious payload. | 3.705968 |

FIG. 5A

| id | description | score |
|---|---|---|
| CVE-2021-44228 | Apache Log4j2 2.0-beta9 through 2.15.0 (excluding security releases 2.12.2, 2.12.3, and 2.3.1) JNDI features used in configuration, log messages, and parameters do not protect against attacker controlled LDAP and other JNDI related endpoints. An attacker who can control log messages or log message parameters can execute arbitrary code loaded from LDAP servers when message lookup substitution is enabled. From log4j 2.15.0, this behavior has been disabled by default. From version 2.16.0 (along with 2.12.2, 2.12.3, and 2.3.1), this functionality has been completely removed. Note that this vulnerability is specific to log4j-core and does not affect log4net, log4cxx, or other Apache Logging Services projects. | 0.695091516794908 |
| CVE-2021-44832 | Apache Log4j2 versions 2.0-beta7 through 2.17.0 (excluding security fix releases 2.3.2 and 2.12.4) are vulnerable to a remote code execution (RCE) attack when a configuration uses a JDBC Appender with a JNDI LDAP data source URI when an attacker has control of the target LDAP server. This issue is fixed by limiting JNDI data source names to the java protocol in Log4j2 versions 2.17.1, 2.12.4, and 2.3.2 | 0.688218861762412 |
| CVE-2017-5645 | In Apache Log4j 2.x before 2.8.2, when using the TCP socket server or UDP socket server to receive serialized log events from another application, a specially crafted binary payload can be sent that, when deserialized, can execute arbitrary code. | 0.679348913579085 |
| CVE-2019-11292 | Pivotal Ops Manager, versions 2.4.x prior to 2.4.27, 2.5.x prior to 2.5.24, 2.6.x prior to 2.6.16, and 2.7.x prior to 2.7.5, logs all query parameters to tomcat's access file. If the query parameters are used to provide authentication, i.e. credentials, then they will be logged as well | 0.662784224090373 |
| CVE-2019-17571 | Included in Log4j 1.2 is a SocketServer class that is vulnerable to deserialization of untrusted data which can be exploited to remotely execute arbitrary code when combined with a deserialization gadget when listening to untrusted network traffic for log data. This affects Log4j versions up to 1.2 up to 1.2.17. | 0.659976971023883 |
| CVE-2018-20105 | A Inclusion of Sensitive Information in Log Files vulnerability in yast2-rmt of SUSE Linux Enterprise Server 15, openSUSE Leap allows local attackers to learn the password if they can access the log file. This issue affects: SUSE Linux Enterprise Server 15 yast2-rmt versions prior to 1.2.2. openSUSE Leap yast2-rmt versions prior to 1.2.2. | 0.646880826491806 |
| CVE-2017-6165 | In F5 BIG-IP LTM, AAM, AFM, Analytics, APM, ASM, DNS, GTM, Link Controller, PEM, and WebSafe 11.5.1 HF6 through 11.5.4 HF4, 11.6.0 through 11.6.1 HF1, and 12.0.0 through 12.1.2 on VIPRION platforms only, the script which synchronizes SafeNet External Network HSM configuration elements between blades in a clustered deployment will log the HSM partition password in cleartext to the "/var/log/ltm" log file. | 0.646863234654262 |
| CVE-2020-10750 | Sensitive information written to a log file vulnerability was found in jaegertracing/jaeger before version 1.18.1 when the Kafka data store is used. This flaw allows an attacker with access to the container's log file to discover the Kafka credentials. | 0.646711219802129 |
| CVE-2019-4477 | IBM WebSphere Application Server 7.0, 8.0, 8.5, and 9.0 could allow a user with access to audit logs to obtain sensitive information, caused by improper handling of command line options. IBM X-Force ID: 163997. | 0.646164683101424 |
| CVE-2018-1349 | The NetIQ Identity Manager driver log file, in versions prior to 4.7, provides details that could aid in system or configuration enumeration. | 0.645691003116001 |

FIG. 5B

| id | description | score |
|---|---|---|
| CVE-2020-8611 | In Progress MOVEit Transfer 2019.1 before 2019.1.4 and 2019.2 before 2019.2.1, multiple SQL Injection vulnerabilities have been found in the REST API that could allow an authenticated attacker to gain unauthorized access to MOVEit Transfer's database via the REST API. Depending on the database engine being used (MySQL, Microsoft SQL Server, or Azure SQL), an attacker may be able to infer information about the structure and contents of the database in addition to executing SQL statements that alter or destroy database elements. | 4.7654634 |
| CVE-2020-8612 | In Progress MOVEit Transfer 2019.1 before 2019.1.4 and 2019.2 before 2019.2.1, a REST API endpoint failed to adequately sanitize malicious input, which could allow an authenticated attacker to execute arbitrary code in a victim's browser, aka XSS. | 4.524521 |
| CVE-2018-6545 | Ipswitch MoveIt v8.1 is vulnerable to a Stored Cross-Site Scripting (XSS) vulnerability, as demonstrated by human.aspx. Attackers can leverage this vulnerability to send malicious messages to other users in order to steal session cookies and launch client-side attacks. | 4.4066305 |
| CVE-2019-18465 | In Progress MOVEit Transfer 11.1 before 11.1.3, a vulnerability has been found that could allow an attacker to sign in without full credentials via the SSH (SFTP) interface. The vulnerability affects only certain SSH (SFTP) configurations, and is applicable only if the MySQL database is being used. | 4.1883674 |
| CVE-2020-12677 | An issue was discovered in Progress MOVEit Automation Web Admin. A Web Admin application endpoint failed to adequately sanitize malicious input, which could allow an unauthenticated attacker to execute arbitrary code in a victim's browser, aka XSS. This affects 2018 - 2018.0 prior to 2018.0.3, 2018 SP1 - 2018.2 prior to 2018.2.3, 2018 SP2 - 2018.3 prior to 2018.3.7, 2019 - 2019.0 prior to 2019.0.3, 2019.1 - 2019.1 prior to 2019.1.2, and 2019.2 - 2019.2 prior to 2019.2.2. | 3.4482584 |
| CVE-2019-16383 | MOVEit.DMZ.WebApi.dll in Progress MOVEit Transfer 2018 SP2 before 10.2.4, 2019 before 11.0.2, and 2019.1 before 11.1.1 allows an unauthenticated attacker to gain unauthorized access to the database. Depending on the database engine being used (MySQL, Microsoft SQL Server, or Azure SQL), an attacker may be able to infer information about the structure and contents of the database, or may be able to alter the database via the REST API, aka SQL Injection. | 3.4482584 |
| CVE-2019-18464 | In Progress MOVEit Transfer 10.2 before 10.2.6 (2018.3), 11.0 before 11.0.4 (2019.0.4), and 11.1 before 11.1.3 (2019.1.3), multiple SQL Injection vulnerabilities have been found in the REST API that could allow an unauthenticated attacker to gain unauthorized access to the database. Depending on the database engine being used (MySQL, Microsoft SQL Server, or Azure SQL), an attacker may be able to infer information about the structure and contents of the database or may be able to alter the database. | 3.356997 |

FIG. 5C

| id | description | score |
|---|---|---|
| CVE-2019-16383 | MOVEit.DMZ.WebApi.dll in Progress MOVEit Transfer 2018 SP2 before 10.2.4, 2019 before 11.0.2, and 2019.1 before 11.1.1 allows an unauthenticated attacker to gain unauthorized access to the database. Depending on the database engine being used (MySQL, Microsoft SQL Server, or Azure SQL), an attacker may be able to infer information about the structure and contents of the database, or may be able to alter the database via the REST API, aka SQL Injection. | 0.690703572301016<br>2 |
| CVE-2020-8611 | In Progress MOVEit Transfer 2019.1 before 2019.1.4 and 2019.2 before 2019.2.1, multiple SQL Injection vulnerabilities have been found in the REST API that could allow an authenticated attacker to gain unauthorized access to MOVEit Transfer's database via the REST API. Depending on the database engine being used (MySQL, Microsoft SQL Server, or Azure SQL), an attacker may be able to infer information about the structure and contents of the database in addition to executing SQL statements that alter or destroy database elements. | 0.686304635512326<br>7 |
| CVE-2019-18464 | In Progress MOVEit Transfer 10.2 before 10.2.6 (2018.3), 11.0 before 11.0.4 (2019.0.4), and 11.1 before 11.1.3 (2019.1.3), multiple SQL Injection vulnerabilities have been found in the REST API that could allow an unauthenticated attacker to gain unauthorized access to the database. Depending on the database engine being used (MySQL, Microsoft SQL Server, or Azure SQL), an attacker may be able to infer information about the structure and contents of the database or may be able to alter the database. | 0.675425694012134<br>1 |
| CVE-2020-8612 | In Progress MOVEit Transfer 2019.1 before 2019.1.4 and 2019.2 before 2019.2.1, a REST API endpoint failed to adequately sanitize malicious input, which could allow an authenticated attacker to execute arbitrary code in a victim's browser, aka XSS. | 0.664555911464443<br>1 |
| CVE-2019-6838 | A CWE-863: Incorrect Authorization vulnerability exists in U.motion Server (MEG6501-0001 - U.motion KNX server, MEG6501-0002 - U.motion KNX Server Plus, MEG6260-0410 - U.motion KNX Server Plus, Touch 10, MEG6260-0415 - U.motion KNX Server Plus, Touch 15), which could allow a user with low privileges to delete a critical file. | 0.659606634460611<br>2 |
| CVE-2020-36664 | A vulnerability has been found in Artesãos SEOTools up to 0.17.1 and classified as problematic. This vulnerability affects the function setTitle of the file SEOMeta.php. The manipulation of the argument title leads to open redirect. Upgrading to version 0.17.2 is able to address this issue. The name of the patch is ca27cd0edf917e0bc80522701388b8b5a1f01fb. It is recommended to upgrade the affected component. The identifier of this vulnerability is VDB-222232. In Artesãos SEOTools bis 0.17.1 wurde eine problematische Schwachstelle gefunden. Betroffen ist die Funktion setTitle der Datei SEOMeta.php. Durch Beeinflussen des Arguments title mit unbekannten Daten kann eine open redirect-Schwachstelle ausgenutzt werden. Ein Aktualisieren auf die Version 0.17.2 vermag dieses Problem zu lösen. Der Patch wird als ca27cd0edf917e0bc80522701388b8b5a1f01fb bezeichnet. Als bestmögliche Massnahme wird das Einspielen eines Upgrades empfohlen. | 0.658605923269127<br>7 |
| CVE-2019-18465 | In Progress MOVEit Transfer 11.1 before 11.1.3, a vulnerability has been found that could allow an attacker to sign in without full credentials via the SSH (SFTP) interface. The vulnerability affects only certain SSH (SFTP) configurations, and is applicable only if the MySQL database is being used. | 0.657269104128391<br>8 |

FIG. 5D

| id | description | score |
|---|---|---|
| CVE-2020-36665 | A vulnerability was found in Artesãos SEO Tools up to 0.17.1 and classified as critical. This issue affects the function eachValue of the file TwitterCards.php. The manipulation of the argument value leads to open redirect. Upgrading to version 0.17.2 is able to address this issue. The name of the patch is ca27cd0edf917e0bc80522701 3859b8b5a1f01fb. It is recommended to upgrade the affected component. The identifier VDB-222233 was assigned to this vulnerability., Eine kritische Schwachstelle wurde in Artesãos SEOTools bis 0.17.1 gefunden. Betroffen davon ist die Funktion eachValue der Datei TwitterCards.php. Dank der Manipulation des Arguments value mit unbekannten Daten kann eine open redirect-Schwachstelle ausgenutzt werden. Ein Aktualisieren auf die Version 0.17.2 vermag dieses Problem zu lösen. Der Patch wird als ca27cd0edf917e0bc80522701 3859b8b5a1f01fb bezeichnet. Als bestmögliche Massnahme wird das Einspielen eines Upgrades empfohlen. | 0.6508372744835246 |
| CVE-2018-8078 | YzmCMS 3.7 has Stored XSS via the title parameter to advertisement/adver/edit.html. | 0.6493687035956002 |
| CVE-2019-6836 | A CWE-863: Incorrect Authorization vulnerability exists in U.motion Server (MEG6501-0001 - U.motion KNX server, MEG6501-0002 - U.motion KNX Server Plus, MEG6260-0410 - U.motion KNX Server Plus, Touch 10, MEG6260-0415 - U.motion KNX Server Plus, Touch 15), which could allow the file system to access the wrong file. | 0.6484602153427941 |

FIG. 5D (Cont.)

AI-POWERED MACROS TO PROCESS COMPLEX NLP QUERIES ACROSS DOMAINS

CROSS REFERENCE TO OTHER APPLICATIONS

This application claims priority to U.S. Provisional Patent Application No. 63/568,851 entitled AI-POWERED MACROS TO PROCESS COMPLEX NLP QUERIES ACROSS DOMAINS filed Mar. 22, 2024, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 4 illustrates an example entity extraction in accordance with some embodiments.

FIGS. 5A-D illustrate preliminary testing results of the experiment performed in this first case study in accordance with some embodiments.

DETAILED DESCRIPTION

Figure 1:
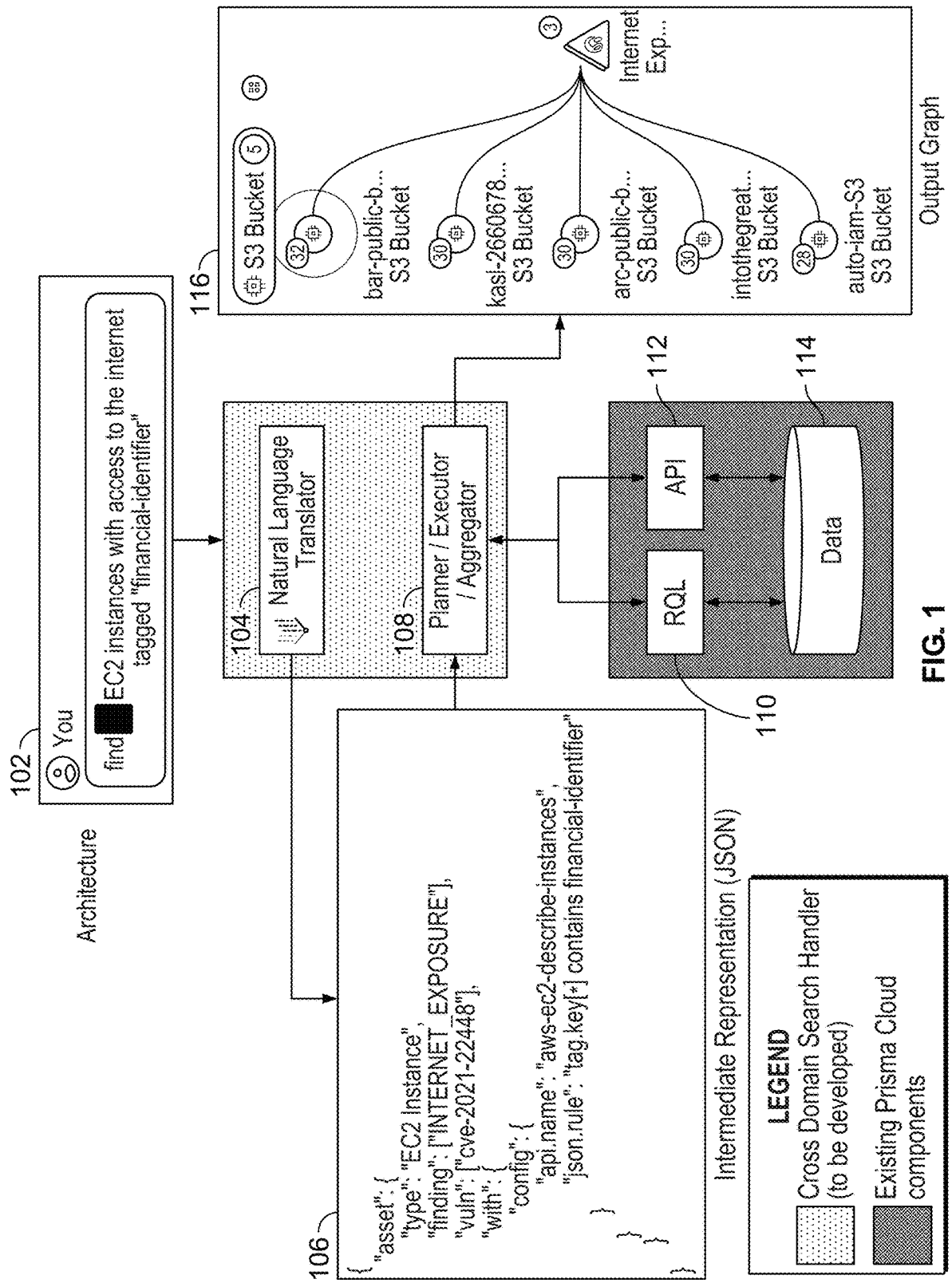
FIG. 1 illustrates an overview of an architecture for AI-powered macros to process complex natural language processing (NLP) across domains in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all these specific details. For the purpose of clarity, technical material that is known in the technical fields related to the invention has not been described in detail so that the invention is not unnecessarily obscured.

Technical Challenges for Processing Queries Across Domains

Generally, a powerful feature of Artificial Intelligence (AI)/machine learning (ML) (e.g., generally also referred to herein as AI) is the ability to handle free-form text and build contextually relevant responses. In this context, AI also generally is herein to refer to the recent advances in generative pre-trained models using large-language models (LLM) and neural networks. AI has spurred significant activity in building modules that work collaboratively with the users and provide guidance to solving problems in a variety of applications.

Generally, LLMs can be implemented for various applications based on their training and tuning, such as generating text (e.g., text LLMs generally refer to LLMs specifically trained to handle text dialogs), generating code (e.g., code LLMs generally refer to LLMs trained on code such as Python, SQL, etc.), generating images, etc.

As will be further described below, the disclosed techniques are focused on applying AI to provide enhanced solutions in the security space. Specifically, the disclosed techniques apply various AI techniques to surface threats or breaches in a timely manner, which is of paramount importance for many security services/solutions.

Currently, the security space offers a range of tools to solve problems in Cloud Security Posture Management (CSPM) and Cloud Native Application Protection (CNAPP). However, the vast majority of these tools are specialized, and the user interfaces are designed to address a narrow spectrum of the domains. For example, there will be specialized security posture to find individual violations in Configuration, Network, Audit Events, Roles/Permissions, etc. To accomplish cross domain inferences, with the exception of join queries supported by Prisma® Cloud in Configuration (e.g., Prisma® Cloud is a cloud-based security service that is commercially available from Palo Alto Networks, headquartered in Santa Clara, CA, or this is similarly applicable to other commercially available cloud-based security solutions/services), results are pre-computed and cached in a consolidated resource called Assets. While searching with natural language, the user query is very likely to span multiple domains and predicates, unconstrained by the internal representations or implementations.

Traditional approaches using precomputed caches or customized user interfaces typically cannot handle the explosive combination of domains, partial orders, and predicates. Precomputations relate to annotating a global asset about findings or vulnerabilities seen in resources associated with the asset. For example, an EC2 Instance, an Amazon Cloud Resource, may be configured with a network interface and ports that are exposed to the Internet. The Internet exposure is determined by an independent policy engine that scans for violations periodically. Once a violation is detected, the policy engine generates an alert that is propagated to the asset via periodic polling. The policy violation is recorded on the asset with a finding called "INTERNET_EXPOSURE". Assuming assets are updated in real time (e.g., generally there is a lag due to coordination between independent processes), the user will be able to retrieve responses to queries such as "Find me EC2 Instances with access to the Internet" based on the last finding snapshot received. Similarly, vulnerabilities are periodically scanned, and an independent process determines if a resource is vulnerable and creates a record on the asset.

Consider a user query that goes one step further, posed as "Find me EC2 Instances with access to the internet and tagged as financial-identifier." This query cannot be fully answered by the precomputed caches as there is no knowledge about tags in the asset domain. Instead, the system has to discover resources that are tagged as "financial-identifier" and additionally contain the findings about Internet access. Furthermore, we could have a very large number of such predicates that cannot be processed unless we inspect multiple domains simultaneously. In general, if the precomputed cache contains a join between two cloud resources A and C, a search system cannot respond to a dynamic query inquiring about A and N. This example illustrates the limitations of the existing approaches to providing security insights with precomputed caches or customized user interfaces.

A popular approach in contemporary AI is to detect the intent of the text, before proceeding to templated query processing. The selected intent may lead us to a good response, if it fits within a single domain. If there is an error in the intent-detection, the proposed recovery is through "context repair." Repairing a context is computationally expensive. The system has to know what facts to keep and what to forget before switching to another trail of thought. Hence, these approaches are time-consuming, error-prone, and unscalable. Early commitments to intents can veer down paths from which recovery becomes very difficult. Given that a single intent cannot justify a multi-domain search, the system could produce solutions that are only partial to the query addressed, leading often to dead ends and incomplete responses.

Thus, new and improved techniques are needed for processing complex queries across domains.

Overview of Techniques for AI-Powered Macros to Process Complex NLP Queries Across Domains Accordingly, new and improved techniques for AI-powered macros to process complex natural language processing (NLP) across domains are disclosed.

For example, various techniques are disclosed that facilitate an effective and efficient solution for gracefully handling multi-domain queries utilizing various Artificial Intelligence (AI)/machine learning (ML) techniques (e.g., generally also referred to herein as AI, such as generative pre-trained models using large-language models (LLM) and neural networks) as further described below.

In some embodiments, a system, a process, and/or a computer program product for AI-powered macros to process complex natural language processing (NLP) across domains includes processing a natural language query; performing a cross-domain search to generate a search result using a plurality of data source domains using a resource query language (RQL) and a Large Language Model (LLM); and outputting the search result (e.g., an output graph of assets in response to the natural language query).

For example, performing the cross-domain search to generate the search result using a plurality of data source domains can further include using a planner, executor, and aggregator to collect distinct results from each of the plurality of domains and/or further using an application programming interface (API).

In an example implementation, the plurality of data source domains includes a configuration data set, an Identity and Asset Management (IAM) data set, and a vulnerability data set.

In some embodiments, a system, a process, and/or a computer program product for AI-powered macros to process complex NLP across domains further includes performing the cross-domain search to generate the search result using a plurality of data source domains further includes executing a plurality of RQLs in a ranked order and aggregating results for the search result.

For example, the disclosed techniques for AI-powered macros to process complex NLP across domains can be applied to facilitate robust handling of ad hoc, mixed domain queries, such as will be further discussed below.

Moreover, the disclosed techniques for AI-powered macros to process complex NLP across domains provide for efficient resolution without major backtracking as further discussed below.

As such, the disclosed techniques for AI-powered macros to process complex NLP across domains can effectively and efficiently be applied to facilitate expanded, cross-domain searches as will also be further described below.

These and other aspects and embodiments for AI-powered macros to process complex NLP across domains will now be further described below.

System Embodiments for AI-Powered Macros to Process Complex NLP Queries Across Domains AI-Powered Macros to Process Complex NLP Queries Across Domains Various system embodiments for AI-powered macros to process complex natural language processing (NLP) across domains are disclosed.

FIG. 1 illustrates an overview of an architecture for AI-powered macros to process complex natural language processing (NLP) across domains in accordance with some embodiments. Specifically, a solution for AI-powered macros to process complex NLP across domains is described that can be effectively and efficiently provided for any environment that includes a mix of DSL (Domain Specific Language) and API (Application Programming Interface) to provide search responses. More specifically, FIG. 1 illustrates an example implementation of an architecture for applying AI-powered macros to process complex NLP across domains in a security computing context as will now be further described below.

Referring to FIG. 1, a user can find their configured EC2 instances with access to the Internet tagged "financial-identifier" as shown at 102. Specifically, the disclosed architecture facilitates an effective extraction of structural queries from text, using LLMs and Information Retrieval (IR).

A natural language translator 104 processes the user's query received at 102 to generate an intermediate representation as shown at 106. In this example implementation, the intermediate representation is in a JavaScript Object Notation (JSON) format (e.g., or another format can similarly be used for the intermediate representation). The intermediate representation is then provided as input to the planner/executor/aggregator component 108.

In this example implementation, the planner/executor/aggregator component 108 provides for the specification and implementation of an abstract planning language that dynamically constructs a plan, assembles the results, and seamlessly provides the response within the constructs of an existing presentation layer that can generate an output of the result as shown at output graph 116. Specifically, in this example implementation, a cloud security service (e.g., using the Prisma® Cloud security framework, which is a commercially available cloud security service available from Palo Alto Networks, Inc., headquartered in Santa Clara, CA) is used as a vehicle to present the disclosed techniques for applying AI-powered macros to process complex NLP across domains in a security computing context.

As also shown, the planner/executor/aggregator component 108 is in communication with a Resource Query Language (RQL) component 110. In this example implementation, the domain specific language (DSL) for the Prisma Cloud security framework is referred to as RQL. Specifically, RQL is available for the following domains (e.g., various mixed domains) of the security space: (1) configuration; (2) network; (3) audit events; (4) identity and access management (IAM); (5) cloud network security; (6) vulnerabilities; (7) assets; (8) findings; and/or various other domains of the security space can similarly be specified using RQL. As will also be apparent, these techniques can be similarly applied to other technology spaces, such as cloud computing, etc.

The domain of RQL is query processing. Generally, it entails defining a high-level language to express policies using vocabulary from, in this example implementation, the cloud security domain, building a valid query sentence by populating suggestions from various domain resources, generating an executable query against various data sources, filtering results against given criteria, and presenting the results for visualization, as will be further described herein.

As also shown, the planner/executor/aggregator component 108 is in communication with an application programming interface (API) component 112. In this example implementation, more than two hundred APIs are available to query data including the following examples: (1) alerts; (2) inventory; (3) compliance; and (4) reports, etc. Specifically, the various RQLs and APIs become the primitive building blocks upon which the multi-domain query language is based as will be further described below.

As such, the above-described architecture as shown in FIG. 1 can be used to automatically specify the intermediate representation for converting NLP to a structured query and to then build an AI planner to process the query by proper sequencing and assemblies of intermediate results from various data sources as shown at 114. The output can then be delivered within the constructs of an existing presentation layer, such as output graph 116. For example, the disclosed techniques can be implemented using the above-described architecture illustrated in FIG. 1 to provide an effective and efficient AI copilot solution for a cloud security service (e.g., Prisma Cloud AI Copilot).

Figure 2:
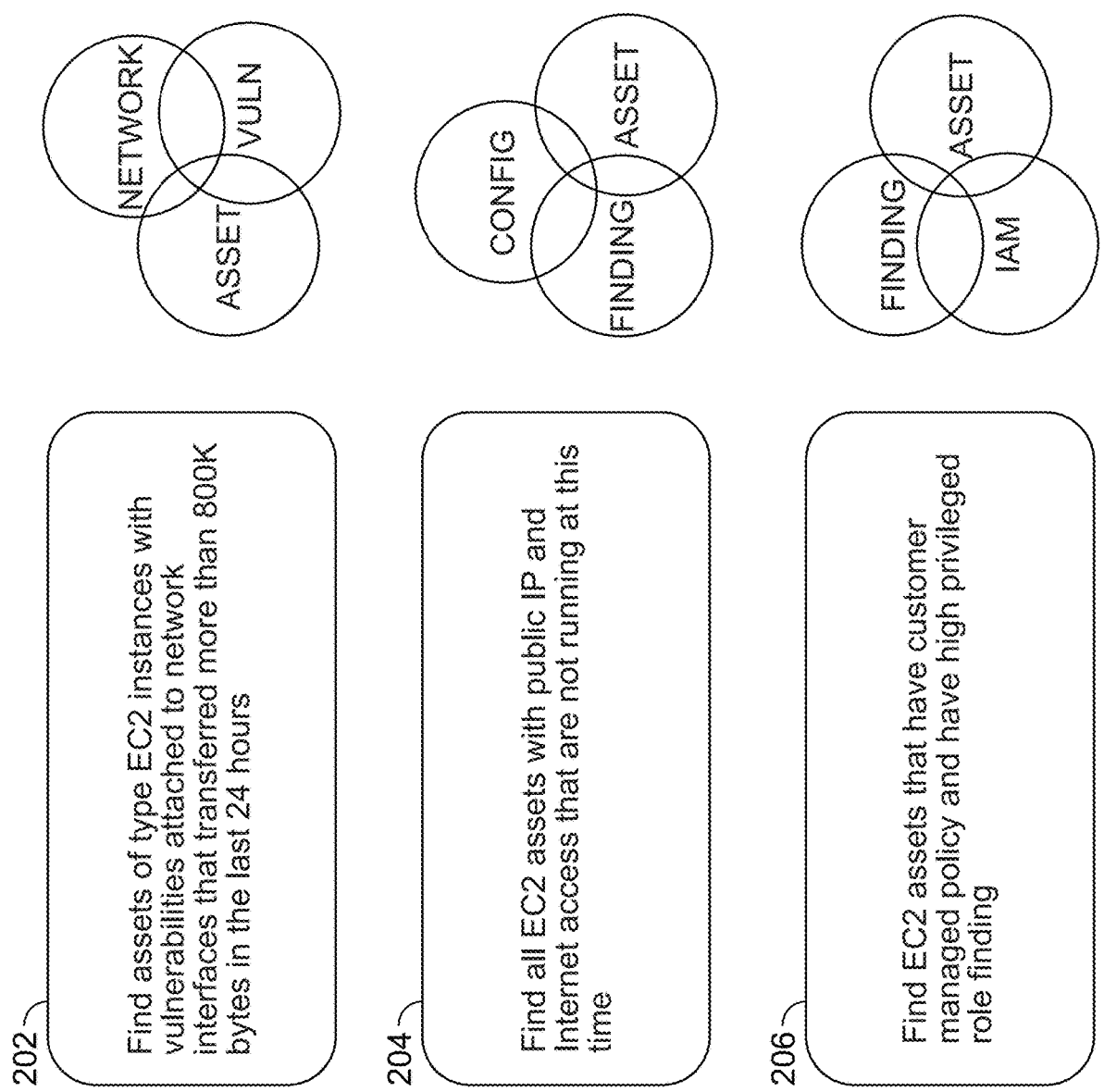
FIG. 2 illustrates multi-domain query examples in accordance with some embodiments.

FIG. 2 illustrates multi-domain query examples in accordance with some embodiments. Specifically, examples of multi-domain queries in a security service (e.g., the Prisma Cloud security service or another cloud security service) are shown in FIG. 2.

An example multi-domain query 202 is for a request to find assets of type EC2 instances with vulnerabilities attached to network interfaces that transferred more than 800 k bytes in the last 24 hours. As such, this multi-domain query involves queries across the following distinct domains: finding, assets, and vulnerability data repositories.

An example multi-domain query 204 is for a request to find all EC2 assets with public IP and Internet access that are not running at this time. As such, this multi-domain query involves queries across the following distinct domains: finding, assets, and configuration data repositories.

An example multi-domain query 206 is for a request to find EC2 assets that have customer managed policy and have a high privileged role finding. As such, this multi-domain query involves queries across the following distinct domains: finding, assets, and IAM data repositories.

Figure 3:
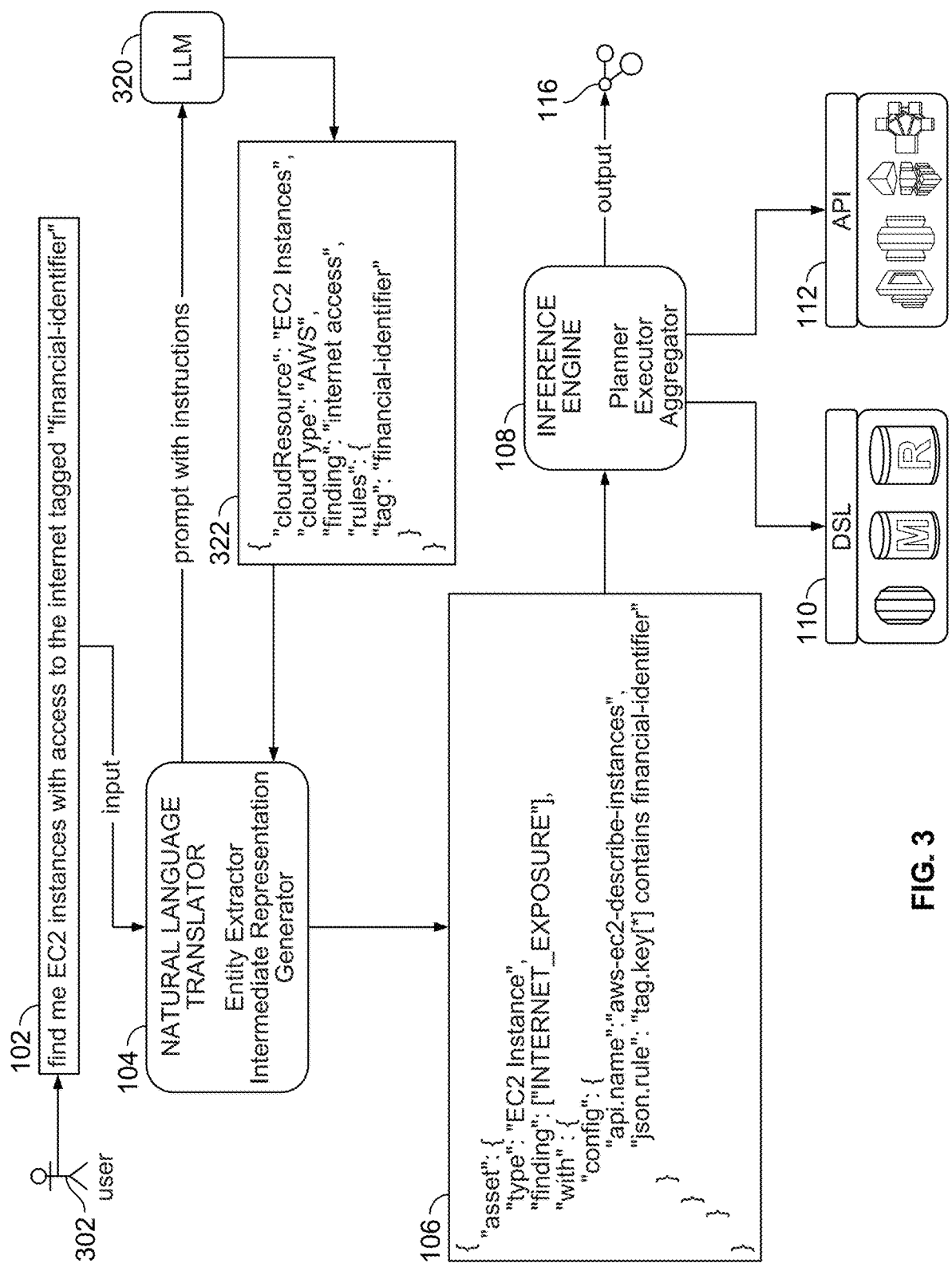
FIG. 3 illustrates a processing view for a multi-domain search architecture for AI-powered macros to process complex NLP across domains in accordance with some embodiments.

FIG. 3 illustrates a processing view for a multi-domain search architecture for AI-powered macros to process complex NLP across domains in accordance with some embodiments. In this example implementation, as similarly shown and described above with respect to FIG. 1, we begin with the assumption that most security vendors (e.g., including cloud-based security service vendors) offer a range of tools that either use a DSL (e.g., implemented using RQL 110 as shown in FIGS. 1 and 3) or an API (e.g., implemented using API 112 as shown in FIGS. 1 and 3) to enable retrieving relevant information (e.g., configuration information, network information, audit event information, cloud instances information, vulnerability information, etc.). In the context of Prisma Cloud, we have the following publicly documented DSL (e.g., publicly available at https://docs.prismacloud.io/en/classic/rql-reference/rql-reference/rql), which includes, for example, the following: (1) configuration information; (2) network information; and (3) audit event information.

For example, Prisma Cloud Resource Query Language (RQL) (e.g., implemented using RQL 110 as shown in FIGS. 1 and 3) is a powerful and flexible tool that helps users, such as a user 302, gain security and operational insights about their deployments in public cloud environments. Users can utilize RQL to perform configuration checks on resources deployed on different cloud platforms and to gain visibility and insights into user and network events. Users can also apply these security insights to create policy guardrails that secure their cloud environments.

In this example implementation, RQL is a structured query language that resembles Structured Query Language (SQL). RQL supports the following example types of queries: (1) Config-Use Config Query to search for the configuration of the cloud resources; (2) Event-Use Event Query to search and audit all the console and API access events in your cloud environment; (3) Network-Use Network Query to search real-time network events in your environment; and/or various other types of queries can be similarly supported using RQL.

As such, users can utilize RQL to find answers to fundamental questions that help them understand what is happening on their network. For example, users can find answers to the following types of questions: (1) does our enterprise have S3 buckets with encryption disabled; (2) does our enterprise have databases that are directly accessible from the Internet; (3) who uses a root account to manage day-to-day administrative activities on my network; (4) which cloud resources are missing critical patches that make them exploitable; etc.

As similarly described above, multiple APIs (112) are included in the architecture that provide responses about various domains, such as alerts, compliance, inventory, reports, etc.

However, converting natural language text queries directly to a specialized DSL poses significant technical challenges. Large-Language Models (LLMs) are largely trained on public repositories with an abundance of examples. For example, converting a piece of text to either Python code or SQL (Structured Query Language) is easier to accomplish with LLMs trained on a huge repository of time-tested examples on the web or GitHub.

But specialized DSLs, such as RQL, have limited presence on the web, making it more difficult for LLMs to do a robust translation for converting natural language text (NLP) queries to specialized DSLs, such as RQL. In the case of RQL, only the default policies are documented and available on the web. Hidden from the LLM are numerous custom policies with rich formulations that are proprietary. Also, the foundations of the DSLs are not easily available compared to relational languages, such as SQL, and programming languages, such as Python. As such, in this example implementation, a customized inference engine 108 (e.g., including planner, executor, and aggregator modules as similarly shown and described above with respect to FIG. 1) is provided to accomplish the translation for converting natural language text (NLP) queries to specialized DSLs, such as RQL.

Specifically, we address the above technical challenges by providing the following technical improvement to facilitate a robust translation for converting natural language text (NLP) queries to specialized DSLs, such as RQL. First, instead of having an LLM, such as shown at 320, go directly from text to RQL, we specify an intermediate format that is easily reachable by the LLMs, in quality and precision, such as shown at 322. Following this, we also define a robust transformation procedure to convert the intermediate representation as shown at 106 to the final DSL format (e.g., RQL).

As shown in FIG. 3, the process to handle multi-domain queries involves the following modules: (1) Natural Language Translator 104 that includes the following modules: an entity extractor and an intermediate representation generator 106 as shown; and (2) an Inference Engine 108 that includes the following modules: a planner, an executor, and an aggregator. Each of these sub-components will be further described below.

Referring to the modules of the natural language translator (104), an entity extractor is provided as a module of the natural language translator. Using its extensive knowledge from the web, the LLM performs entity recognition and generates a structured JSON representation equivalent to the input query. To accomplish this, suitable prompts and instructions using the lexicon in our application are generated for training the LLM (e.g., single shot or few shot training of the LLM can be utilized in this example implementation).

An example prompt is provided below.

You are a computer security expert. If I give a text query, you will be able to recognize the various entities. The entities are: cloudType, cloudResource, findings, vulnerabilities, and rules. Give the output in JSON format.

```
Input Text:
Find me EC2 instances with access to the internet tagged "financial-identifier".
Output JSON:
{
   "cloudResource": "EC2 Instances",
   "cloudType": "AWS",
   "finding": "internet access",
   "rules": {
     "tag": "financial-identifier"
   }
}
```

Note that the LLM automatically deduced the cloudType with its general knowledge about cloud security and associated documentation about Amazon Web Services (AWS).

FIG. 4 illustrates an example entity extraction in accordance with some embodiments. The above-described entity extractor module of the natural language translator (104) can be used to perform this example entity extraction.

Referring again to the modules of the natural language translator (104) as shown in FIG. 3, an intermediate representation generator (106) is provided as a module of the natural language translator. Using a combination of semantic searches (e.g., using LLM embeddings) and retrieval augmentation (e.g., classical information retrieval methods related to auto-indexing with TF (Term Frequency) and IDF (Inverse Document Frequency)), the values of the fields are mapped to strings that are present in the cloud resources. For example: "internet access" under the domain of Findings will retrieve "INTERNET_EXPOSURE" as the best match and "EC2 Instance" will map to a known API name in the repository aws-ec2-describe-instances. The extracted "rules" field will transfer to a JSON rule condition as documented in the Prisma Cloud RQL Language.

```
{
   "asset": {
     "type": "EC2 Instance",
     "finding": ["INTERNET_EXPOSURE"],
     "with" : {
       "config": {
          "api.name":"aws-ec2-describe-instances",
          "json.rule": "tag.key[*] contains financial-identifier"
       }
     }
   }
}
```

Note that such a language structure does not exist in Prisma Cloud. It is simply an abstraction to compute the results of a multi-domain search. The language structures supported and documented in Prisma Cloud are siloed, specific to each domain. As such, we are creating a pseudo query across domains without any prior grammar or language definition. Nevertheless, this pseudo query creates a cross domain query structure that can be parsed and processed by the planning module as will now be described below.

Referring to the modules of the inference engine (108), a planner is provided as a module of the inference engine. The planner is generated from generic abstractions, for performing the following: (1) selecting the domain query to execute; (2) executing the domain query and retrieving the JSON output; (3) joining or filtering results based on domain specific identifiers; (4) propagating results to relevant parts of the query plan; and (5) applying pagination (optional).

In an example implementation, a Backus normal form (BNF) definition is provided for the planner. The planning language for this application can work with a very generic structure and a set of operators covering conjunctions, disjunctions, and negations, which allows for calling individual DSL domains, obtaining the result in a JSON format, and applying aggregations (e.g., joins and filters). In addition, the language parser can maintain a hierarchy of processing operations to complete before a final result is generated.

Below is an example BNF definition.

Query:=DSL_Query|API_Query

DSL_Query:=domainQuery(AND WITH:(domain-Query))

DSL_Query:=domainQuery AND domainQuery

DSL_Query:=domainQuery OR domainQuery

DSL_Query:=NOT domainQuery

API_Query:=apiQuery domainQuery:=assetQuery|configQuery|networkQuery|eventQuery|apiQuery apiQuery:=alertsApiQuery|complianceApiQuery|reportsApiQuery|

Inventory ApiQuery

In this example implementation, by default, the planner assumes the output format of the parent domain query. Hence, for the query presented in FIG. 3, the output is an Asset graph (e.g., shown as output graph 116). As another example, for a cross domain query with network and config domains, the output would be a network graph.

To assemble the overall result, the planner executes the nested tasks and propagates the results to the parent query and assembles based on consistent domain identifiers (e.g., it is typically the Resource Identifier). Extremely large subquery results can be automatically paginated (e.g., as an optional stage of processing).

Also, DSL wrappers can be created for all the domain APIs. For example, this makes the maintenance cleaner, separating the data access layer from the domain specific predicates.

For saving a search result, all individual domains have the ability to save a search as a DSL (e.g., RQL). In this example implementation, once a text query is converted by the disclosed system/process/computer program product, the equivalent DSL query will be saved.

In order to generate a multi-domain policy, individual domain policies are created first. These policy pointers can be added to the output as a global policy.

Various use cases for AI-powered macros to process complex NLP across domains will now be described below. Experiments and Use Cases for AI-Powered Macros to Process Complex NLP Queries Across Domains As similarly discussed above, the disclosed techniques can be applied to various use cases for AI-powered macros to process complex NLP queries across domains in a security context, such as will now be described below.

For example, there currently exists a paucity of realistic training instances for asset RQL queries. As such, synthetic generation of training data can be utilized as well as test instances using the underlying grammar. Selecting a probability distribution is another technical challenge in synthetic test data generation.

Generally, LLMs are opaque boxes. For example, it can be difficult to determine the "loss of matches" in an LLM-based approach to solving the above-described problems for processing complex NLP queries across domains, such as in a security context. Specifically, in the context of either vulnerabilities or findings, losing matches could pose significant issues for users of such a solution (e.g., posing increased security risks for their enterprise computing environments).

As such, while semantic search provides a vast net of possible contexts to capture, the security domain queries can often be short sentences that likely include high-value (e.g., high entropy) keywords. As a result, with short queries working towards context building, LLM-based suggestions are likely to be less accurate due to a wider context in which the LLMs are trained. The repositories needed to address the queries in the security domain could be specialized, narrowed and not necessarily indexed by an LLM.

Even if a domain repository, such as Mitre data (e.g., publicly available sources of security/attack related data, which is publicly available at https://attack.mitre.org/datasources/), is indexed by an LLM, it may not be current and is unlikely to have seen all possible queries that may be targeted at the index.

In a pure AI/ML approach, both "few-shot learning" and "fine-tuning" are trial-and-error AI/ML training approaches (e.g., for LLMs) that require multiple trials or generation/accumulation of a significant number of training instances. Furthermore, the resulting AI/ML models would likely be sensitive to domain data changes requiring continuous adaptation/updating. The adaptation/updating process can add to maintenance costs associated with the solution for processing complex NLP queries across domains, such as in a security context.

LLMs are effective AI/ML tools for entity recognition, given their built-in Information Extraction modules (e.g., as similarly discussed above with respect to FIG. 4). As such, the disclosed techniques utilize the entity recognition features of an LLM for providing a solution for processing complex NLP queries across domains (e.g., generating the building blocks across the different attributes in the RQL using a combination of information retrieval (IR) and AI/ML, such as further described below).

In this experiment and example uses cases further described below, the disclosed techniques using IR and AI/ML are applied for an asset RQL.

The design of the experiments for using IR and AI/ML applied for an asset RQL will now be described.

We first performed a range of tests and compared the retrieval quality between AI/ML and IR using the following: (1) single keyword searches (e.g., search terms: log 4j or log 4J2, MOVEit); (2) phrasal searches; (3) full sentences after the IR index is equipped with stop words, stems, and synonyms (e.g., a typical use case is: "What are my assets with log 4j vulnerabilities?"; utilization of term frequencies (Term and Document) in boosting keywords at query time; and utilization of facets to get insights into various distributions, thereby selecting the appropriate words in a prompt).

The Mitre vulnerability database has been used in this AI CoPilot case study to demonstrate the effective building of RQL queries from the natural language inputs. The Mitre JSON data is rich, offering a multitude of fields on which we can build predicates. In this example, the CVE ID and the associated description were used in the AI CoPilot index.

Generation of the IR index will now be described. The IR index was generated using multiple cores (e.g., shards). For the initial investigation in this experiment, we focused on the vulnerabilities. Similarly, the Findings, Assets, and Relationships can be added to their respective cores.

Approximately 71K documents between the years 2017-2023 from the Mitre CVE JSON 5.0 data were inserted into the IR index. All JSON paths are fully enumerated and stored for individual search within a path.

In seeking accurate matches, the preliminary index was based on word boundaries. Various IR enhancements can also be utilized, such as stemming, stop words, phrases, synonyms, etc.

Generation of the AI index will now be described. The AI index was built by generating Gecko embeddings (e.g., to convert textual data into numerical vectors to capture the semantic meaning and context of the words to facilitate processing by AI/ML techniques) for each CVE Description and the following fields are stored for processing: (1) ID; (2) description; and (3) embedding vector.

For initial research, we performed a full table scan of the entire set of embeddings to determine the top ten matches, ranked in descending order of similarity score.

To expedite finding matches in the embeddings store, improvements such as clustering or organizing the various embeddings by distance were evaluated.

FIGS. 5A-D illustrate preliminary testing results of the experiment performed in this first case study in accordance with some embodiments. Specifically, the preliminary testing results of IR versus AI will now be described for this experiment.

The below table summarizes the accuracy of the results obtained for single keyword searches.

TABLE 1

| Keyword Test | Method | |
| --- | --- | --- |
| | IR | AI |
| log4j or log4J2 | 7/7 (100%) | 4/7 (57%) |
| MOVEit | 7/7 (100%) | 4/7 (57%) |

LLM-based (AI) approach is still desired for entity recognition in a user query. For extracting the parameter values in short text queries containing essential keywords (i.e., log 4j, MOVEit, etc.), the LLM-based (AI) search has an accuracy rate of 0.4 compared to 1.0 using standard information retrieval (IR) techniques. In essence, the AI approach is missing some vulnerability records. It is possible we could do better in the AI search by modifying the parameters in Gecko or updating to later versions.

These preliminary tests in this example experiment and other experiments based on phrasal searches can determine how to obtain maximum precision (e.g., no loss of vital records) in the disclosed AI CoPilot/AI-powered macros for processing complex NLP across domains.

As such, the observations from the initial experiments provide a path for a combined approach using the Grammar, IR, and AI approaches to crafting the Asset RQL.

Figure 6:
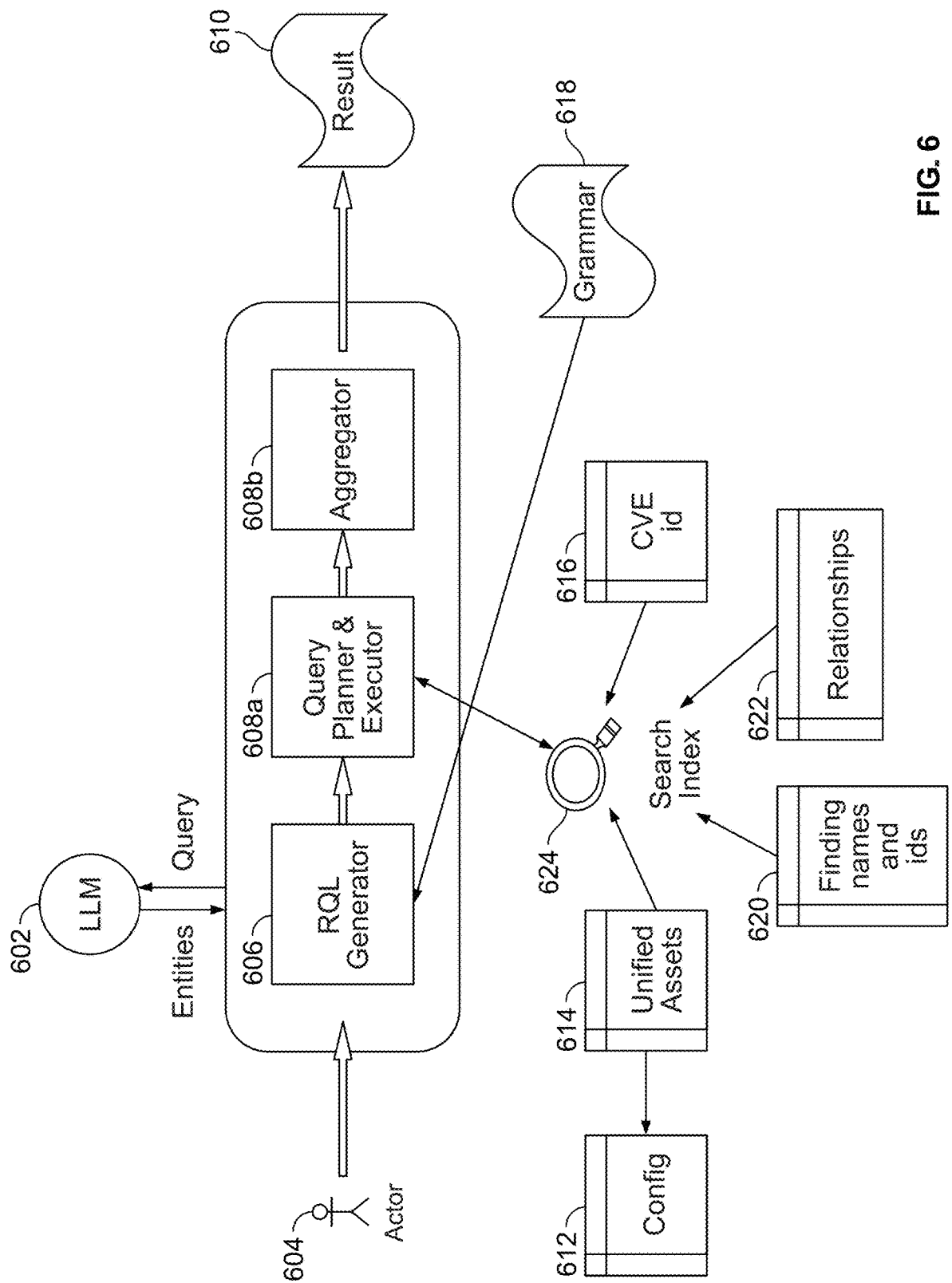
FIG. 6 illustrates an architecture and problem-solving diagram for generating an RQL in accordance with some embodiments.

FIG. 6 illustrates an architecture and problem-solving diagram for generating an RQL in accordance with some embodiments.

Specifically, in an example implementation, the Asset RQL grammar is used as the foundation for interpreting and transforming user queries to RQL, shown as a final RQL as shown at 610 in FIG. 6. For example, a customized vector space for the individual parameters (e.g., configuration information 612 and unified assets information (UAI) 614, findings such as file names and IDs 620, relationships 622, vulnerabilities such as CVE IDs 616, etc., can be provided as input to a search index 624, as well as a grammar 618 (e.g., a Hyperion grammar or other grammar can similarly be used as input to the RQL generator) can be utilized to provide enhanced accuracy for an RQL generator 606 that generates RQLs for input to evaluation and ranking using Query Planner and Executor 608a and Aggregator 608b to facilitate generating a final RQL 610.

More specifically, in this example implementation, the samples include unified assets information (UAI) (614), findings (e.g., Cloud Security Posture Management (CSPM), Identity and Asset Management (IAM), CAN, etc.), vulnerabilities (e.g., within asset RQL, including three parameters for vulnerabilities: CVE ID, Severity, and CVSS score), and relationships (e.g., a certain/threshold percentage of assets should be connected).

Further, the IR approach can help to suggest a limited lexicon specific to the use case, such as vulnerabilities in the prompts (e.g., for the LLM). The application scope begins with individual tests for vulnerabilities, findings, and then progresses to Asset related parameters, such as Asset Type, Asset Class, and Relationships. Asset configurations can be added to the goals, allowing us to process NLP queries that refer to config parameters, such as "tags" or predicates over the JSON paths.

In the AI approach using an external LLM as shown at 602 in FIG. 6, the statistical properties of words and associations are exhibited via the embeddings. The embeddings do not provide a glimpse into the individual words and co-occurrences until a semantic match is executed.

Further, the IR world presents an opportunity to statically examine the various word/phrase distributions, paving the way for enriching the IR search or to utilize the statistical properties in building more effective prompts.

As such, the above-described techniques of utilizing an IR in combination with an AI using LLMs can facilitate the automated generation of a customized lexicon for each usage context (e.g., Findings, Vulnerabilities, etc.). This will help to optimize the embedding vectors in the disclosed AI LLM techniques as described herein.

In addition, as also shown in FIG. 6, the inclusion of asset configurations and relationships is provided. As such, concurrent searches can be executed on other repositories, such as asset repositories to integrate relevant information to a given query received by a user, such as shown at 604.

The statistical properties extracted from the search repositories, frequencies, and facets also provide for executing high-precision searches in the IR index.

By analyzing a large number of transactions, we can find the best way to combine the search results returned by both IR and AI approaches to maximize precision and minimize latencies.

In this example implementation, an LLM-based entity recognition can be provided using, for example, Chat Bison to extract the entities in any given user query, such as illustrated in FIG. 4 as described above. The entities can be constrained using a customized lexicon from the IR module and output in JSON format.

Below is an example context for prompting the LLM for this example implementation.

Prompt:

You are an expert entity recognizer. The primary entities are Findings, Vulnerabilities, Assets, and Relationships. For any given user text, provide the extracted entities in a JSON structure.

Specifically, an example entity extraction using the disclosed techniques is shown in FIG. 4 as similarly described above.

Additional example use cases for testing are provided below.

Example Use Case 1

```
Show me the assets with log4j vulnerability
AI:
{
"vulnerabilities": "log4j",
"asset": "all",
"cloudType": "all"
}
```

Example Use Case 2

```
Which EC2 instances have unrestricted access from the Internet, are talking to Backdoor
hosts, and have vulnerabilities of high severity or greater?
AI:
{
"findings": "unrestricted access from the internet",
"vulnerabilities": "high severity or greater",
"asset": "EC2 instances",
"relationships": "talks to Backdoor hosts"
}
```

Example Search Indices Implementation

The embeddings used by the AI CoPilot reside in SingleStore, or another commercially/publicly available (real-time) data warehouse can similarly be used. Specifically, SingleStore is configured to execute the Cosine Similarity matches directly on the data (e.g., the embedding is a column value in a DB table) through a full table scan to get the top N (as required) hits.

In this example implementation, the embeddings can be stored in a Lucene index or another commercially/publicly available search index can similarly be used. Further, the research embeddings can be organized in clusters for fast processing.

Below is an example set of findings based on the above-described experiment. Specifically, the findings were collected using asset class and finding types. The rationale is to use higher-level constructs in the taxonomy of types, thereby covering samples across many assets and finding types. The vulnerabilities appeared in only 4/982 asset types across all clouds (e.g., 2 in AWS, 1 in Azure, and 1 in Google Cloud). Within those assets there is a huge collection of vulnerabilities. The same lopsided distribution is seen in all three stacks: host0, host1 and host2. The findings are spread over many asset classes. Vulnerabilities are limited to very few asset classes but appear in large counts within those classes. In this experiment, rank by latencies was as follows: host2 (fastest), host0, host1 (slowest) (e.g., app4 appears to have the best data distribution for deriving training data).

A summary of these experiment findings is provided below.

| host | finding type count | rank by size of (Asset Class, Finding Type) | comments |
| --- | --- | --- | --- |
| host0 | 12/70 | Compute_HIGH_PRIVILEGED_ROLE<br>Compute_INTERNET_EXPOSURE<br>Compute_PRIVILEGE_ESCALATION<br>Compute_CROSS_ACCOUNT_TRUST<br>Compute_UNAUTHORIZED_ACCESS<br>Compute_MISCONFIGURATION<br>Compute_KEYS_AND_SECRETS<br>Compute_UNENCRYPTED_DATA<br>Compute_RECONNAISSANCE<br>Compute_INITIAL_ACCESS<br>Compute_DEFENSE_EVASION<br>Compute_RESOURCE_HIJACKING | Only 1 asset class |

-continued

| host | finding type count | rank by size of (Asset Class, Finding Type) | comments |
|---|---|---|---|
| host1 | 45/217 | Security_PRIVILEGE_ESCALATION<br>Compute_PRIVILEGE_ESCALATION<br>Compute_UNUSED_PRIVILEGES<br>Other_HIGH_PRIVILEGED_ROLE<br>Compute_CROSS_ACCOUNT_TRUST<br>Compute_INTERNET_EXPOSURE<br>Database_MISCONFIGURATION<br>Other_PRIVILEGE_ESCALATION<br>Other_MISCONFIGURATION<br>Network_MISCONFIGURATION<br>Compute_HIGH_PRIVILEGED_ROLE<br>Storage_INTERNET_EXPOSURE<br>Security_HIGH_PRIVILEGED_ROLE<br>Storage_MISCONFIGURATION<br>Security_MISCONFIGURATION<br>Security_KEYS_AND_SECRETS<br>Security_WEAK_PASSWORD<br>Compute_UNAUTHORIZED_ACCESS<br>Other_UNAUTHORIZED_ACCESS<br>Security_UNAUTHORIZED_ACCESS<br>Security_UNUSED_PRIVILEGES<br>Compute_MISCONFIGURATION<br>Security_USER_ANOMALY<br>Other_UNENCRYPTED_DATA<br>Other_CROSS_ACCOUNT_TRUST<br>Storage_PRIVILEGE_ESCALATION<br>Compute_UNENCRYPTED_DATA<br>Compute_KEYS_AND_SECRETS<br>Network_INTERNET_EXPOSURE<br>Database_UNENCRYPTED_DATA<br>Security_CROSS_ACCOUNT_TRUST<br>Storage_UNENCRYPTED_DATA<br>Network_UNENCRYPTED_DATA<br>Security_MFA<br>Storage_UNAUTHORIZED_ACCESS<br>Security_UNENCRYPTED_DATA<br>Storage_MFA<br>Other_INTERNET_EXPOSURE<br>Compute_RECONNAISSANCE<br>Storage_CROSS_ACCOUNT_TRUST<br>Database_PRIVILEGE_ESCALATION<br>Other_UNUSED_PRIVILEGES<br>Database_INTERNET_EXPOSURE<br>Storage_UNUSED_PRIVILEGES<br>Compute_DEFENSE_EVASION | Six types of asset classes<br>20% coverage across all asset classes and finding types |
| host2 | 86/217 | Compute_INTERNET_EXPOSURE<br>Compute_PRIVILEGE_ESCALATION<br>Security_PRIVILEGE_ESCALATION<br>Other_MISCONFIGURATION<br>Database_MISCONFIGURATION<br>Database_INTERNET_EXPOSURE<br>Network_MISCONFIGURATION<br>Security_MISCONFIGURATION<br>Other_PRIVILEGE_ESCALATION<br>Compute_HIGH_PRIVILEGED_ROLE<br>Storage_INTERNET_EXPOSURE<br>Security_HIGH_PRIVILEGED_ROLE<br>Storage_MISCONFIGURATION<br>Security_KEYS_AND_SECRETS<br>Security_WEAK_PASSWORD<br>Compute_UNAUTHORIZED_ACCESS<br>Other_UNAUTHORIZED_ACCESS<br>Storage_UNAUTHORIZED_ACCESS<br>Security_UNUSED_PRIVILEGES<br>Compute_INITIAL_ACCESS<br>Security_USER_ANOMALY<br>Compute_UNUSED_PRIVILEGES<br>Storage_PRIVILEGE_ESCALATION<br>Storage_MFA<br>Other_UNENCRYPTED_DATA<br>Other_CROSS_ACCOUNT_TRUST<br>Compute_MISCONFIGURATION<br>Compute_UNENCRYPTED_DATA<br>Network_INTERNET_EXPOSURE<br>Compute_KEYS_AND_SECRETS | 7 asset classes<br>39% coverage across all asset classes and finding types |

| host | finding type count | rank by size of ( Asset Class, Finding Type) | comments |
|---|---|---|---|
| | | Security_UNAUTHORIZED_ACCESS | |
| | | Compute_CROSS_ACCOUNT_TRUST | |
| | | Security_CROSS_ACCOUNT_TRUST | |
| | | Storage_UNENCRYPTED_DATA | |
| | | Database_UNENCRYPTED_DATA | |
| | | Compute_RECONNAISSANCE | |
| | | Security_UNENCRYPTED_DATA | |
| | | Network_UNENCRYPTED_DATA | |
| | | Security_MFA | |
| | | Other_HIGH_PRIVILEGED_ROLE | |
| | | Storage_CROSS_ACCOUNT_TRUST | |
| | | Database_PRIVILEGE_ESCALATION | |
| | | Compute_DEFENSE_EVASION | |
| | | Other_INTERNET_EXPOSURE | |
| | | Other_UNUSED_PRIVILEGES | |
| | | Security_RESOURCE_HIJACKING | |
| | | Network_UNUSED_PRIVILEGES | |
| | | Network_PRIVILEGE_ESCALATION | |
| | | Storage_UNUSED_PRIVILEGES | |
| | | Compute_RESOURCE_HIJACKING | |
| | | Delivery_COMMAND_AND_CONTROL | |
| | | Delivery_HIGH_PRIVILEGED_ROLE | |
| | | Delivery_PRIVILEGE_ESCALATION | |
| | | Delivery_CROSS_ACCOUNT_TRUST | |
| | | Delivery_UNAUTHORIZED_ACCESS | |
| | | Delivery_CREDENTIAL_ACCESS | |
| | | Delivery_DATA_EXFILTRATION | |
| | | Delivery_RESOURCE_HIJACKING | |
| | | Delivery_INTERNET_EXPOSURE | |
| | | Delivery_KEYS_AND_SECRETS | |
| | | Delivery_LATERAL_MOVEMENT | |
| | | Delivery_UNUSED_PRIVILEGES | |
| | | Delivery_MISCONFIGURATION | |
| | | Delivery_UNENCRYPTED_DATA | |
| | | Delivery_DEFENSE_EVASION | |
| | | Delivery_INITIAL_ACCESS | |
| | | Delivery_RECONNAISSANCE | |
| | | Delivery_WEAK_PASSWORD | |
| | | Delivery_USER_ANOMALY | |
| | | Delivery_DISCOVERY | |
| | | Delivery_MALWARE | |
| | | Security_COMMAND_AND_CONTROL | |
| | | Delivery_MFA | |
| | | Security_CREDENTIAL_ACCESS | |
| | | Security_DATA_EXFILTRATION | |
| | | Security_INTERNET_EXPOSURE | |
| | | Security_LATERAL_MOVEMENT | |
| | | Security_DEFENSE_EVASION | |
| | | Security_INITIAL_ACCESS | |
| | | Security_RECONNAISSANCE | |
| | | Kubernetes_HIGH_PRIVILEGED_ROLE | |
| | | Kubernetes_PRIVILEGE_ESCALATION | |
| | | Kubernetes_COMMAND_AND_CONTROL | |
| | | Kubernetes_CROSS_ACCOUNT_TRUST | |
| | | Kubernetes_UNAUTHORIZED_ACCESS | |
| | | Kubernetes_RESOURCE_HIJACKING | |

Referring to FIG. 6, RQL Generator 606 can be implemented using the following processing operations (e.g., for an asset RQL generator). Specifically, in this example implementation, entities are first extracted in JSON formation.

Second, the JSON data is converted to a generic asset query.

Third, searches using Information Retrieval (IR) are performed, for example, implemented using listeners to handle the search in IR (e.g., for vulnerabilities, all IDs for the matching text can be searched and collected; for findings, all the finding types for a given text can be searched and collected; for relationships, edges with a source and sink can be searched and collected; etc.).

Fourth, if an asset type=ALL, the generic template for RQL can be provided as follows: (1) asset where asset.class IN ( . . . ) and finding.name IN ( . . . ) and with (vuln where id IN ( . . . )); and (2) asset where asset.type IN ( . . . ) and finding.name IN ( . . . ) and with (vuln where id IN ( . . . )). In some cases, to reduce our dependency on RQL processing and unforeseen errors, internal indices can be used to discover asset IDs. Hence, the template for RQL resembles the following: asset where asset.id IN ( . . . ) and finding-.name IN ( . . . ) and with: (vuln where id IN ( . . . )).

Fifth, the available RQLs are then ranked.

Sixth, the ranked RQLs are then executed in ranked order. For example, in some cases, the candidate sets can be reduced by executing the most generic form of RQL.

The following example asset RQL covers all asset types and searches all CVE IDs for log 4j:

```
 1.  asset where asset.type IN (
 2.    'aws-acm-describe-certificate',
 3.    'aws-describe-account-attributes',
 4.    'aws-describe-auto-scaling-groups',
 5.    'aws-ec2-autoscaling-launch-configuration',
 6.    'aws-elasticbeanstalk-configuration-settings',
 7.    'aws-elasticbeanstalk-environment',
 8.    'aws-elbv2-target-group',
 9.    'aws-elbv2-target-health',
10.    'aws-account-management-alternate-contact',
11.    'aws-elb-describe-load-balancers',
12.    'aws-code-artifact-domain',
13.    'aws-cloudhsm-cluster',
14.    'aws-cloud9-environment',
15.    'aws-dms-endpoint',
16.    'aws-vpc-nat-gateway',
17.    'aws-ec2-describe-network-acls',
18.    'aws-ec2-describe-network-interfaces',
19.    'aws-ec2-describe-security-groups',
20.    'aws-ec2-describe-subnets',
21.    'aws-ec2-traffic-mirroring',
22.    'aws-vpc-transit-gateway',
23.    'aws-vpc-transit-gateway-attachment',
24.    'aws-vpc-transit-gateway-route-table',
25.    'aws-ec2-describe-vpcs',
26.    'aws-vpc-dhcp-options',
27.    'aws-ec2-describe-instances',
28.    'aws-ec2-classic-instance' )
29.  AND with : (vuln where id IN (
30.    'CVE-2021-44228',
31.    'CVE-2021-44530',
32.    'CVE-2017-5645',
33.    'CVE-2019-17531',
34.    'CVE-2021-44832',
35.    'CVE-2019-17571',
36.    'CVE-2021-9488'))
```

Result:

```
{
  "graphs": [
    {
      "graph": {
        "nodes": {
          "CVE-2019-17571": {
            "label": "CVE-2019-17571",
            "type": "Vulnerability",
            "metadata": {
              "severity": "critical",
              "score": 9.8,
              "patchable": true,
              "published": 1576862100000
            }
          },
          "8c9e2bf194a8f08d89b9a26c59014fe8": {
            "label": "ubuntu18-jira",
            "type": "PrimaryAsset",
            "metadata": {
              "externalAssetId": "i-075688f1c9d8f5d06",
              "assetType": "EC2 Instance",
              "assetCategory": "VM Instance",
              "apiId": "16",
              "accountId": "767399230204",
              "findingCount": 19,
              "lastModifiedAt": 1693145412789
            }
          }
        },
        "edges": [
          {
            "source": "b928ce51ff418f08d998ab992a806c4e",
            "target": "CVE-2019-17571",
            "directed": true,
            "relation": "CONTAINS"
          }
        ]
      }
    }
  ],
  "resultMetadata": {
    "searchId": "6e837834-24dd-4fe1-8b07-1bcc19604665",
    "cloudType": "aws",
    "convertedQuery": "asset where asset.type IN ( 'aws-acm-describe-certificate', 'aws-describe-account-attributes', 'aws-describe-auto-scaling-groups', 'aws-ec2-autoscaling-launch-configuration', 'aws-elasticbeanstalk-configuration-settings', 'aws-elasticbeanstalk-environment', 'aws-elbv2-target-group', 'aws-elbv2-target-health', 'aws-account-management-alternate-contact', 'aws-elb-describe-load-balancers', 'aws-code-artifact-domain', 'aws-cloudhsm-cluster', 'aws-cloud9-environment', 'aws-dms-endpoint', 'aws-vpc-nat-gateway', 'aws-ec2-describe-network-acls', 'aws-ec2-describe-network-interfaces', 'aws-ec2-describe-security-groups', 'aws-ec2-describe-subnets', 'aws-ec2-traffic-mirroring', 'aws-vpc-transit-gateway', 'aws-vpc-transit-gateway-attachment', 'aws-vpc-transit-gateway-route-table', 'aws-ec2-describe-vpcs', 'aws-vpc-
```

```
dhcp-options', 'aws-ec2-describe-instances', 'aws-ec2-classic-instance' ) AND with : (vuln where
id IN ('CVE-2021-44228','CVE-2021-44530','CVE-2017-5645','CVE-2019-17531','CVE-2021-
44832','CVE-2019-17571','CVE-2021-9488'))",
    "responseTimeInMs": 334
  }
}
```

Seventh, the RQL generator may or may not be final. It could be an intermediate solution that gets refined by the LLM (e.g., fine-tuned LLM, implemented as a generative pre-trained (GPT) model, used by the CoPilot).

Referring to FIG. 6, RQL Generator 606 can be implemented using the following processing operations (e.g., for a configuration (config) RQL generator). Specifically, in this example implementation, entities are first extracted in JSON formation.

Second, the JSON data is converted to a generic config query template. Specifically, by applying the JSON on the parse tree, we can determine the resulting template to use. JSON rules would follow a separate template. The entity extractor can isolate the rule specific parts and the parameter portions of the RQL.

Third, searches using Information Retrieval (IR) are performed, for example, implemented using listeners to handle search in IR (e.g., to populate the various parameters in the config RQL template).

Fourth, the available RQLs are ranked.

Fifth, the ranked RQLs are then executed in ranked order. For example, in some cases, the candidate sets can be reduced by executing the most generic form of RQL.

Example Unit Tests

Below are example unit tests for cross domain search. Each test includes the pseudo cross domain query and the expected output asset RQL.

Unit Test Case 1:

```
// Case: 1 - Find EC2 instances with internet exposure and vulnerabilities that have a tag key
marked
// satheesh-vulnerability-hyperion
{"asset where asset.type IN ('aws-ec2-describe-instances') and finding.type IN
('INTERNET_EXPOSURE') "
  + "and with : VULN and with : (config from cloud.resource where api.name = 'aws-ec2-
describe-instances' "
  + "and json.rule = "
  + "tags[*].value contains \"satheesh-vulnerability-hyperion\")",
  "asset where asset.type IN ( 'aws-ec2-describe-intances' ) and with : VULN and asset.id IN "
    + "('intothegreatwideopen','i-0271f0b1944aa5e88','i-081c48f704e4586b6')"},
```

Unit Test Case 2:

```
// Case: 2 - Find all EC2 assets with public IP and Internet access and are not running at this time
{"asset where asset.type IN ('aws-ec2-describe-instances','aws-ec2-describe-security-groups')
and with : "
  + "VULN and with : (config from cloud.resource where api.name = 'aws-ec2-describe-
instances' and json"
  + ".rule = state.name does not equal running and publicIpAddress exists and publicIpAddress
is not "
  + "empty as X; config from cloud.resource where api.name = 'aws-ec2-describe-security-
groups' AND json"
  + ".rule = ipPermissions[*].ipRanges[*] contains 0.0.0.0/0 or
ipPermissions[*].ipv6Ranges[*].cidrIpv6 "
  + "contains ::/0 as Y; filter '$.X.securityGroups[*].groupName contains $.Y.groupName';
show X;)",
  "asset where asset.type IN ( 'aws-ec2-describe-instances' , 'aws-ec2-describe-security-groups' )
and "
    + "asset.id IN ('intothegreatwideopen','i-0271f0b1944aa5e88','i-081c48f704e4586b6')"},
```

Unit Test Case 3:

```
// Case: 3 - Find me EC2 instances with internal source IP and network flow greater than 100K
bytes
{"asset where asset.type IN ( 'aws-ec2-describe-instances', 'aws-ec2-describe-network-
interfaces' ) AND "
  + "finding.type IN ( 'INTERNET_EXPOSURE' ) and with : " +
  "(network from vpc.flow_record where bytes > 100000 and source.ip IN ( 10.0.0.0/8,
172.16.0.0/16, 192.168"
    + ".0.0/24 ) limit search records to 500)",
```

-continued

```
"asset where asset.type IN ( 'aws-ec2-describe-instances' ) and with : VULN and asset.id NOT
IN "
    + "('d2a826dbbd577dd5ad9864b03dldf815','5caf2e021578fdc6b9bdf5b197df2e6b')"},
```

Unit Test Case 4:

```
// Case: 4 - Find EC2 assets that have customer managed policy and have high privileged role
finding
{"asset where asset.type IN ('aws-ec2-describe-instances') and finding.type IN ('High Privileged
Role') and "
    + "with : (config from iam where grantedby.cloud.entity.tag exists AND
grantedby.cloud.policy.type IN ( "
    + "'Customer Managed Policy' ))",
    "asset where asset.type IN ( 'aws-iam-list-users' ) AND asset.id IN
( 'BHEBSKEH83BZM6KXNNEM53' ) AND "
    + "finding.type IN('HIGH_PRIVILEGED_ROLE')"},
```

Unit Test Case 5:

```
// Case: 5 - Find EC2 assets accessible from the internet with remediable alerts
{"asset where asset.type IN ('aws-ec2-describe-instances') and finding.type IN
('INTERNET_EXPOSURE') and "
    + "with : (alert where alert.status IN ('open') and policy.remediable is true )",
    "asset where asset.type IN ( 'aws-ec2-describe-instances' ) AND asset.id IN ( 'ALERT001')
AND "
    + "finding.type IN('INTERNET_EXPOSURE')"},
```

Unit Test Case 6:

```
// Case: 6 - Find assets with certain network properties (e.g., cloud
network security (CNS)) and configurations
// TODO { }
```

Unit Test Case 7:

```
// Case: 7 - Show me up to 10 EC2 instances that transferred over 800K Bytes in the last 24
hours, and are
// not optimized for ebs and the machine instance is m4 large
{"asset where asset.type IN ('aws-ec2-describe-instances') and finding.type IN
('INTERNET_EXPOSURE', "
    + "'MISCONFIGURATION') and with : (network from vpc.flow_record where bytes >
800000 limit search records"
    + " to 10) and with : (config from cloud.resource where api.name = 'aws-ec2-describe-
instances' and json"
    + ".rule = ebsOptimized is false and instanceType equals m4.large)", "asset where asset.type
IN "
    + "('aws-ec2-describe-instsances') and finding.type IN
('INTERNET_EXPOSURE','MISCONFIGURATION') and asset"
    + ".id IN ('i-100020003000', 'i-400050001000')"},
```

Unit Test Case 8:

```
// Case: 8 - Filter assets associated with certain events and configurations
// TODO {}
```

Unit Test Case 9:

```
// Case: 9 - Filter assets associated with certain anomalies and configurations
// TODO: { }
```

Unit Test Case 10:

```
// Case: 10 - Find aws assets with vulnerabilities and have at least 3 attached VPCS
// config from cloud.resource where cloud.type = 'aws' AND api.name = 'aws-ec2-describe-vpcs'
as X; count(X)
// greater than 3
{" asset where cloud.type IN ('aws') and asset.class IN ('Compute') and with : vuln and with : " +
    "(config where cloud.type = 'aws' and api.name = 'aws-ec2-describe-vpcs' as X; count(X)
greater than 3)",
    "asset where cloud.type IN ('aws') and asset.class IN ('Compute') and with : vuln and asset.id
IN ('id-1',"
        + "'id-2'))"}
```

Additional example process embodiments for AI-powered macros to process complex natural language processing (NLP) across domains will now be further described below.

Figure 7:
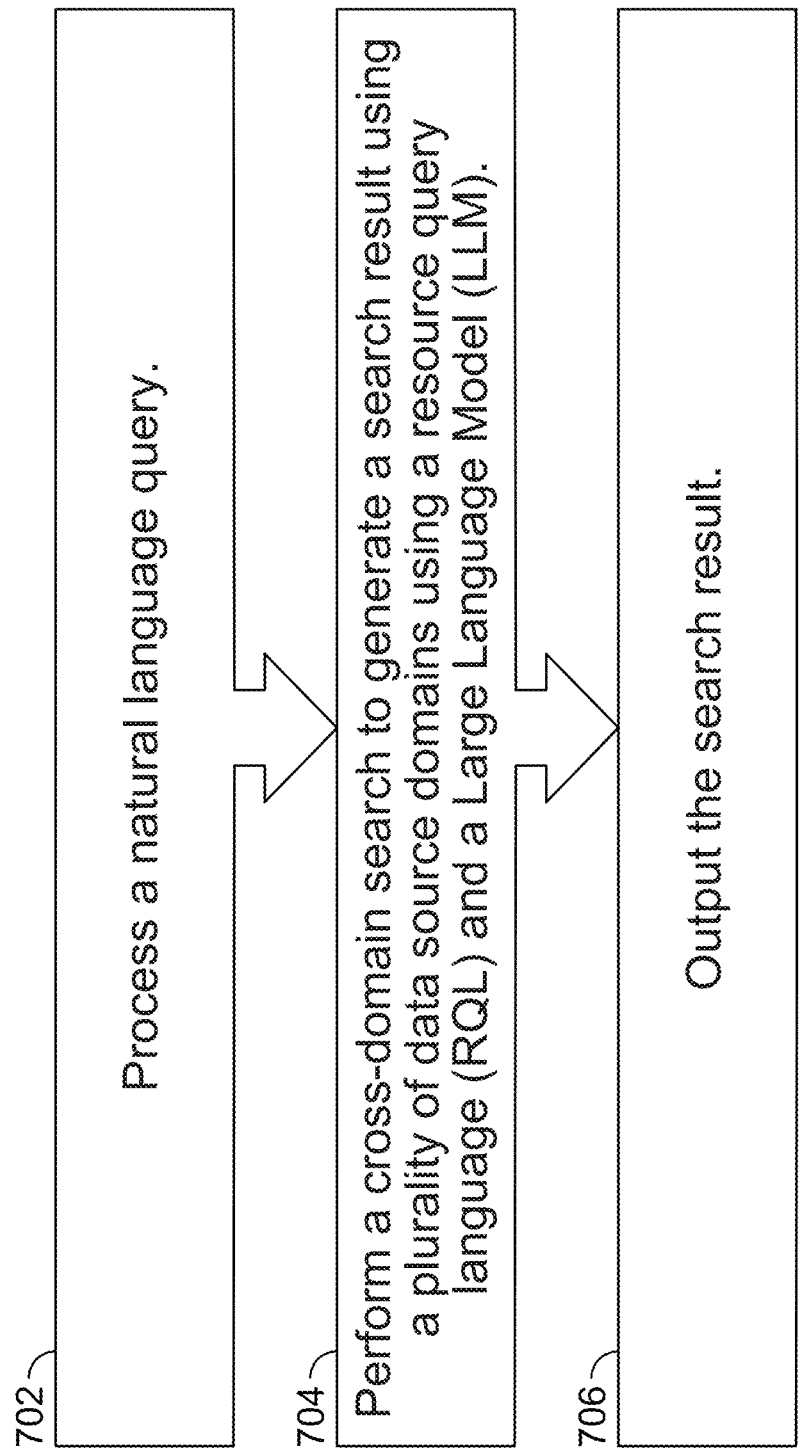
FIG. 7 is a flow diagram for AI-powered macros to process complex natural language processing (NLP) across domains in accordance with some embodiments.

Process Embodiments for AI-Powered Macros to Process Complex NLP Queries Across Domains FIG. 7 is a flow diagram for AI-powered macros to process complex natural language processing (NLP) across domains in accordance with some embodiments. In some embodiments, a process as shown in FIG. 7 is performed by a resource query language (RQL) and a Large Language Model (LLM), and techniques as similarly described above including the embodiments described above with respect to FIGS. 1-6.

At 702, processing a natural language query is performed as similarly described above with respect to FIGS. 1-6.

At 704, a cross-domain search is performed to generate a search result using a plurality of data source domains using a resource query language (RQL) and a Large Language Model (LLM) as similarly described above with respect to FIGS. 1-6.

At 706, the search result is output as similarly described above with respect to FIGS. 1-6.

Figure 8:
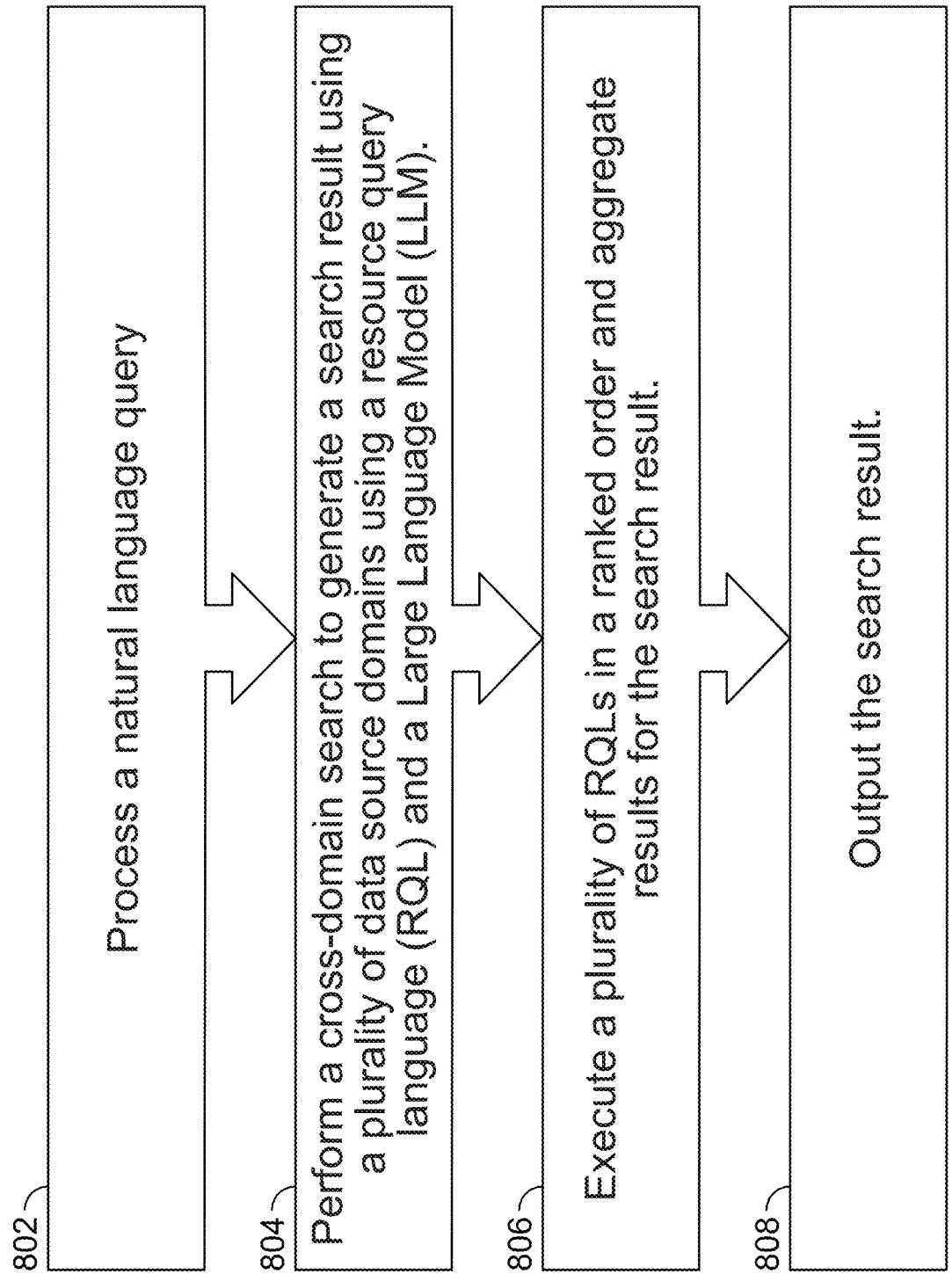
FIG. 8 is another flow diagram for AI-powered macros to process complex NLP across domains in accordance with some embodiments.

FIG. 8 is another flow diagram for AI-powered macros to process complex NLP across domains in accordance with some embodiments. In some embodiments, a process as shown in FIG. 8 is performed by a resource query language (RQL) and a Large Language Model (LLM), and techniques as similarly described above including the embodiments described above with respect to FIGS. 1-6.

At 802, processing a natural language query is performed as similarly described above with respect to FIGS. 1-6.

At 804, a cross-domain search is performed to generate a search result using a plurality of data source domains using a resource query language (RQL) and a Large Language Model (LLM) as similarly described above with respect to FIGS. 1-6.

At 806, executing a plurality of RQLs in a ranked order and aggregating results for the search result are performed as similarly described above with respect to FIGS. 1-6.

At 808, the search result is output as similarly described above with respect to FIGS. 1-6.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   process a natural language query;
   perform a cross-domain search to generate a search result using a plurality of data source domains using a resource query language (RQL) and a Large Language Model (LLM), comprising to:
   generate a structured JSON representation related to the natural language query;
   search, based on a generic asset query associated with the structured JSON representation, a vulnerability database to obtain a set of vulnerabilities; and
   perform, based a ranked set of RQLs covering a set of asset types, a search to generate the search result, wherein the set of asset types relate to information retrieved from the information retrieval, wherein the ranked set of RQLs relates to the set of vulnerabilities, wherein the ranked set of RQLs includes a plurality of RQLs; and
   output the search result; and
   a memory coupled to the processor and configured to provide the processor with instructions.

2. The system of claim 1, wherein performing the cross-domain search to generate the search result using the plurality of data source domains further includes using a planner, executor, and aggregator to collect distinct results from each of the plurality of data source domains.

3. The system of claim 1, wherein performing the cross-domain search to generate the search result using the plurality of data source domains further includes using a planner, executor, and aggregator to collect distinct results from each of the plurality of data source domains and further using an application programming interface (API).

4. The system of claim 1, wherein the plurality of data source domains includes a configuration data set, an Identity and Asset Management (IAM) data set, and a vulnerability data set.

5. The system of claim 1, wherein the RQL is generated for RQL for multi-domain security applications.

6. The system of claim 1, wherein the LLM is trained for performing automated entity extraction for multi-domain security applications.

7. The system of claim 1, wherein the processor is further configured to:
   generate an output graph of assets in response to the natural language query.

8. The system of claim 1, wherein the processor is further configured to:
   execute the ranked set of RQLs in a ranked order and aggregate results for the search result.

9. A method, comprising:
   processing a natural language query;
   performing a cross-domain search to generate a search result using a plurality of data source domains using a resource query language (RQL) and a Large Language Model (LLM); (LLM), comprising:

generating a structured JSON representation related to the natural language query;

searching, based on a generic asset query associated with the structured JSON representation, a vulnerability database to obtain a set of vulnerabilities; and performing, based a ranked set of RQLs covering a set of asset types, a search to generate the search result, wherein the set of asset types relate to information retrieved from the information retrieval, wherein the ranked set of ROLs relates to the set of vulnerabilities, wherein the ranked set of RQLs includes a plurality of RQLs; and outputting the search result.

10. The method of claim 9, wherein performing the cross-domain search to generate the search result using the plurality of data source domains further includes using a planner, executor, and aggregator to collect distinct results from each of the plurality of data source domains.

11. The method of claim 9, wherein performing the cross-domain search to generate the search result using the plurality of data source domains further includes using a planner, executor, and aggregator to collect distinct results from each of the plurality of data source domains and further using an application programming interface (API).

12. The method of claim 9, wherein the plurality of data source domains includes a configuration data set, an Identity and Asset Management (IAM) data set, and a vulnerability data set.

13. The method of claim 9, further comprising:
generating an output graph of assets in response to the natural language query.

14. The method of claim 9, further comprising:
executing the ranked set of RQLs in a ranked order and aggregating results for the search result.

15. A computer program product embodied in a non-transitory computer readable medium and comprising computer instructions for:

processing a natural language query;

performing a cross-domain search to generate a search result using a plurality of data source domains using a resource query language (RQL) and a Large Language Model; (LLM), comprising:

generating a structured JSON representation related to the natural language query;

searching, based on a generic asset query associated with the structured JSON representation, a vulnerability database to obtain a set of vulnerabilities; and performing, based a ranked set of RQLs covering a set of asset types, a search to generate the search result, wherein the set of asset types relate to information retrieved from the information retrieval, wherein the ranked set of ROLs relates to the set of vulnerabilities, wherein the ranked set of RQLs includes a plurality of RQLs; and outputting the search result.

16. The computer program product of claim 15, wherein performing the cross-domain search to generate the search result using the plurality of data source domains further includes using a planner, executor, and aggregator to collect distinct results from each of the plurality of data source domains.

17. The computer program product of claim 15, wherein performing the cross-domain search to generate the search result using the plurality of data source domains further includes using a planner, executor, and aggregator to collect distinct results from each of the plurality of data source domains and further using an application programming interface (API).

18. The computer program product of claim 15, wherein the plurality of data source domains includes a configuration data set, an Identity and Asset Management (IAM) data set, and a vulnerability data set.

19. The computer program product of claim 15, further comprising computer instructions for:
generating an output graph of assets in response to the natural language query.

20. The computer program product of claim 15, further comprising computer instructions for:
executing the ranked set of RQLs in a ranked order and aggregating results for the search result.

* * * * *